Jan. 14, 1941.   A. J. GORLICK   2,228,922
APPARATUS FOR DISTRIBUTING FERTILIZERS, INSECTICIDES, OR THE LIKE
Filed July 11, 1939
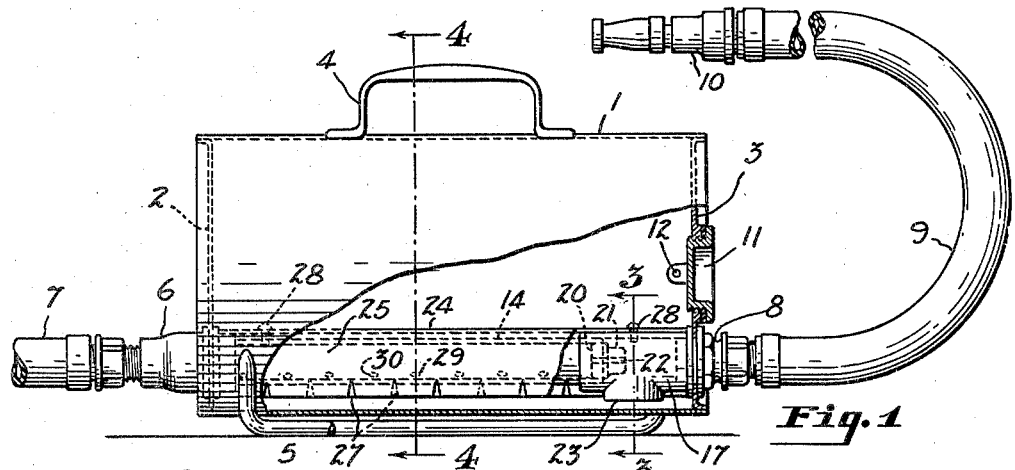
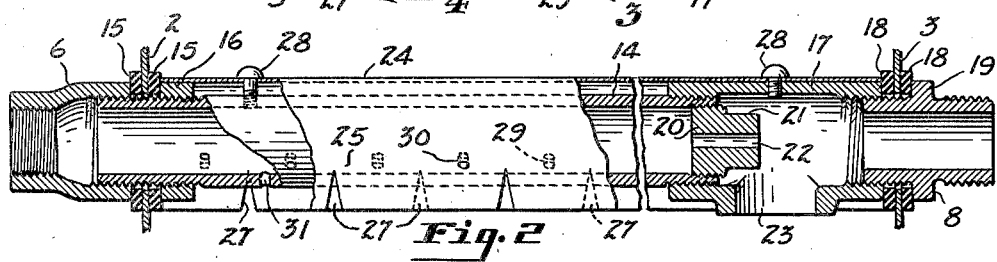
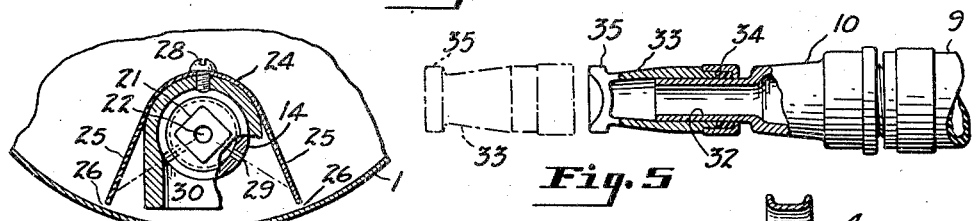
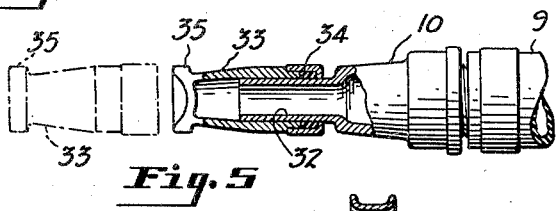
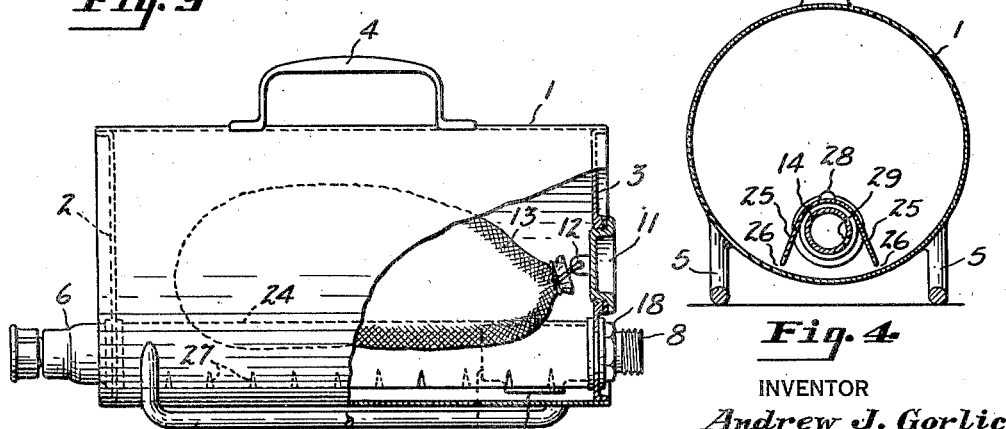
INVENTOR
*Andrew J. Gorlick*
BY *Frank S. Greene*
ATTORNEY Patented Jan. 14, 1941

2,228,922

UNITED STATES PATENT OFFICE 2,228,922

APPARATUS FOR DISTRIBUTING FERTILIZERS, INSECTICIDES, OR THE LIKE

Andrew J. Gorlick, Cleveland Heights, Ohio

Application July 11, 1939, Serial No. 283,867

8 Claims. (Cl. 299—84)

This invention relates to apparatus for distributing fertilizers, insecticides, or the like, and more particularly to a device which is capable of use with ordinary garden hose for distributing soluble or insoluble materials in a spray of water.

In applying commercial fertilizers in powdered or granular form to a lawn, care must be taken to avoid damage to the grass by the chemicals in the fertilizer. Such fertilizers are commonly spread upon the grass when the grass is dry and the lawn is then thoroughly sprayed with water to wash the soluble portion of the fertilizer into the soil before damage is done to the blades of grass.

The present invention has for an object to provide a device in which substantial quantities of fertilizer may be quickly and uniformly distributed by delivering the same with water through a spray nozzle on a garden hose so that the fertilizer is spread and washed into the soil in one operation.

A further object of the invention is to provide a distributing device which may be used to distribute either a highly soluble material or a finely divided material which is only partially soluble or which is substantially insoluble.

A further object of the invention is to provide a distributing device which includes a fluid-tight container adapted to hold a substantial quantity of the material to be distributed and provided with a passageway through which a stream of water under pressure may flow, and so designed that the material in the container will be entrained in the water stream at a substantially uniform rate.

A further object of the invention is to provide a container which has a water passageway therethrough into which material from the container is delivered to the flow of water through the passageway, the passageway being so designed and the water flow so controlled as to maintain a substantially uniform delivery of soluble materials to the water stream.

A further object of the invention is to provide a container adapted to be filled with finely divided material which has a material-entraining passageway for water and a discharge outlet for water and material entrained in the passageway, and which has a filling opening so disposed that the discharge outlet for water and entrained material will not be clogged upon filling the receptacle with finely divided material.

A further object of the invention is to provide a spray nozzle so designed that interruption of the flow of water by accumulation of solid materials in the nozzle is avoided.

With the above and other objects in view, the invention may be said to comprise the device as illustrated in the accompanying drawing hereinafter described and particularly set forth in the appended claims, together with such modifications and variations thereof as will be apparent to those skilled in the art to which the invention appertains.

Reference should be had to the accompanying drawing forming a part of this specification, in which:

Figure 1 is a side elevation of a distributing device embodying the invention with a portion of the container broken away and shown in longitudinal section;

Fig. 2 is a fragmentary longitudinal section through the water passageway in the container, a portion of the water supply conduit being shown in side elevation;

Fig. 3 is a fragmentary section taken on the line indicated at 3—3 in Fig. 1;

Fig. 4 is a section taken on the line indicated at 4—4 in Fig. 1;

Fig. 5 is a sectional view of the spray nozzle; and

Fig. 6 is a side elevation of the device showing a bag for soluble material supported within the container.

As shown in the accompanying drawing, a fluid-tight container 1 is provided for the material to be distributed. This container may be of elongated cylindrical form provided with end portions or heads 2 and 3. Container 1 is provided with a handle 4 by means of which it may be carried and with a pair of runners 5 by means of which it may be supported in a horizontal position, the runners being adapted to slide over the ground so that the container may be dragged about upon the ground during use. The container is provided with an inlet fitting 6 which is attached to the head 2 adjacent the bottom of the container, the fitting 6 being provided with means for attachment to a flexible water supply hose 7 which may be a length of ordinary garden hose connected in the usual manner to a water supply line.

An outlet fitting 8 is attached to the head 3 adjacent the bottom of the container preferably in axial alignment with the inlet fitting 6, the fitting 8 being provided with means for attachment to a flexible discharge hose 9 which may be a length of ordinary garden hose provided with a suitable spray nozzle 10. The head 3 of the container to which the outlet fitting 8 is attached is provided with a filling opening closed by a bung 11 which may be provided with an eyelet 12 projecting from its inner face.

When the device is used for distributing highly soluble material it is preferable to place the soluble materials in a bag formed of porous material from which the soluble material is leached by the water flowing through the container. In Figure 6 of the drawing there is shown a bag 13 which is tied to the eyelet 12. The bag 13 may be placed in the container with its open end projecting through the filling opening and in this position filled with material, after which the open end is tied with a string and attached to the eyelet 12 of the bung, which is then secured in place in the filling opening.

The pipe 14 which forms a part of the water inlet conduit, extends from the head 2 of the container throughout the major portion of the length of the container adjacent the bottom thereof. The pipe 14 forms a part of the inlet fitting and is suitably attached thereto. As herein shown, the inlet fitting 6 is internally threaded and screwed onto the outer end of the pipe 14. To provide a fluid-tight connection with the container, suitable washers 15 may be provided on the pipe 14 for engagement with the interior and exterior of the head 2, the washers being clamped against the interior and exterior of the head 2 by means of the fitting 6 and threaded collar 16 on the pipe 14 within the container. The pipe 14 extends to adjacent the head 3 of the container and is suitably connected to a pipe 17 which forms a part of the discharge conduit. The pipe 17 is suitably secured to the pipe 14 and to the outlet fitting 8. As herein shown, the pipe 17 is internally threaded at both ends, one end being screwed onto the pipe 14 and the other receiving the inner threaded end of the outlet fitting 8. Suitable washers 18 may be provided to prevent leakage around the fitting 8, one of the washers engaging the exterior of the head 3 and the other the interior thereof, the washers being clamped between a flange 19 on the fitting 8 and the outer end of the pipe 17.

At its discharge end the pipe 14 is provided with a restricted outlet for discharging a jet of water axially through the pipe 17 and outlet fitting 8. Any suitable means of restricting the outlet of the pipe 14 may be employed. As herein shown, a plug 20 is secured to the end of the pipe 14, the plug being provided with a reduced portion 21 projecting beyond the end of the pipe 14 into the pipe 17, the plug 20 having a restricted axial passage 22 through which a jet of water is discharged. The pipe 17 is provided with a downwardly facing opening 23 which is closely adjacent the bottom of the container. A jet of water discharged from the restricted passage 22 creates a reduced pressure above the opening 23 and serves to draw water mixed with the material from the container upwardly through the opening 23 and into the discharge conduit, suitable means being provided for maintaining a flow of water through the container exteriorly of the pipe 14.

A passageway for flow of water through the bottom portion of the container is provided by means of a partition member 24 which overlies the pipes 14 and 17 and extends from the head 2 to the head 3 of the container. The partition member 24 has downwardly diverging side portions 25 on opposite sides of the pipes 14 and 17 and the opposite edges of the partition member 24 are spaced slightly, preferably about 1/16", from the cylindrical wall of the container to provide narrow slots 26 through which material in the container may flow into the passageway formed by the partition member. The partition member 24 is also provided along its opposite side edges with spaced vertical slits 27, the slits on each side being regularly spaced and the slits on one side being staggered with respect to the slits on the opposite side. The partition member is secured in fixed position within the container by any suitable means. As herein shown the partition member 24 is attached to the pipes 14 and 17 by means of screws 28. The pipe 14 is provided between the head 2 of the container and its outlet end with rows of opening 29 and 30 through which jets of water are delivered to the interior of the passageway formed by the partition member 24. The openings 29 are staggered with respect to the openings 30, both rows of openings being formed in the under half of the pipe 14 and arranged to direct jets of water laterally and downwardly toward the lower portions of the side edges of the partition member 24, the openings 29 and 30 being positioned between the slits 27 at the edges of the partition member so that the jets of water from these openings are directed toward solid portions of the partition member between the vertical slits.

In the operation of the device, water under pressure entering the pipe 14 is directed laterally through the openings 29 and 30 to supply water to the passageway formed by the partition member 24, and the jet of water through the restricted outlet 22 maintains a fairly rapid and uniform flow through the passageway to the discharge outlet. Some of the water flowing through the passageway passes outwardly into the material in the container through the slits 27, and the streams of water flowing out through the slits 27 serve to maintain a uniform flow of granular or powdered material to the slots 26 and to prevent arching of the finely divided or granular material over the entrance slots 26, thereby maintaining a constant and substantially uniform flow of the material through the slots 26 into the water stream flowing through the passageway. An additional opening 31 in the bottom of the pipe 14 adjacent the head 2 is preferably provided in order to maintain proper flow of water throughout the length of the passageway.

When the container 1 is filled with the granular or powdered materials such materials are drawn at a substantially uniform rate into the stream of water flowing through the passageway formed by the partition member 24, and the water mixed with the solid materials flows through the passageway along the bottom of the container and into the opening 23 of the pipe 17 and is forced by the jet flowing through the passage 22 through the outlet fitting 8 into the hose 9.

When soluble material is being distributed, it is placed in the bag 13, and water flowing out through the slits 27 and slots 26 gradually rises in the container and leaches the soluble material from the bag. The solution in the container exteriorly of the entraining passageway formed by the partition member 24 is drawn at a substantially uniform rate into the stream of water flowing through the passageway.

In handling granular material which are wholly or partly insoluble, difficulty may be experienced due to the clogging of the spray nozzle with solid materials of a size too large to pass through the nozzle opening. To prevent interruption of the discharge under such circumstances the spray nozzle 10 is provided with a tapered reduced end portion 32 upon which a spray tip 33 has a sliding fit. The spray tip 33 has packing rings 34 on the interior thereof which frictionally engage the reduced tapered end portion 32 of the nozzle and serve to normally hold the spray tip in place on the nozzle. The spray tip 33 has a spray forming slot 35 through which granular material in suspension in the water will normally pass, but if the material should contain particles of a size too large to pass through the slot 35 and a sufficient number of such particles accumulate in the nozzle to materially impede the flow of water through the nozzle, the pressure of the water against the clogged end of the tip 33 will force the tip 33 off the nozzle end 32 so that the water may discharge freely through the somewhat larger orifice provided by the reduced portion 32 of the nozzle.

During the delivery of a charge of material from the container the spray from the nozzle 10 may be distributed evenly over a selected area of lawn or garden to which it is desired to apply the quantity of fertilizer, insecticide, or the like with which the container is charged. The emptying of the container is indicated by the discharge of clear water through the spray nozzle. When it is desirable to apply more water to the area over which a fertilizer has been distributed, the spraying may be continued after the fertilizer has been discharged from the container to more thoroughly wash the fertilizer into the soil.

It will be apparent that the present invention provides means for quickly and easily distributing substantial quantities of fertilizer, insecticide, or the like in a spray of water, and that the rate of discharge of such materials is quite uniform so that a very even distribution of the materials may be obtained.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. Apparatus for distributing fertilizers, insecticides and the like, comprising a fluid tight container for the material to be distributed, a member within the container forming an elongated water passageway along the bottom of the container, said passageway having openings along the length thereof closely adjacent the container bottom through which material in the container may enter said passageway, a discharge conduit opening at its inner end to said passageway adjacent one end thereof, a water supply conduit, and means associated with the supply conduit for delivering water into said passageway and for directing an entraining jet of water into the inner end of said discharge conduit whereby water may be caused to flow continuously through said passageway and into the discharge conduit mixed with material from the container.

2. Apparatus for distributing fertilizers, insecticides and the like, comprising an elongated fluid tight container for the material to be distributed, a partition member within the container extending from one end of the container to the other and forming a water passageway along the bottom of the container, said partition member having edge portions spaced from the container bottom to provide openings through which material in the container may enter said passageway, a discharge conduit attached to one end of said container and opening into one end of said passageway, a water supply conduit, and means associated with the water supply conduit for delivering water into said passageway and for directing an entraining jet of water into the discharge conduit, whereby water may be caused to flow continuously through said passageway and into said discharge conduit mixed with material from the container.

3. Apparatus for distributing fertilizers, insecticides and the like, comprising an elongated fluid-tight container for the material to be distributed, a partition member within the container extending from one end of the container to the other and forming a water passageway along the bottom of the container, said partition member having edge portions spaced from the container bottom to provide openings through which material in the container may enter said passageway, a discharge conduit attached to one end of said container and opening into one end of said passageway, a water supply conduit attached to the opposite end of the container and extending into said passageway, said supply conduit having a restricted outlet adjacent the discharge conduit for directing an entraining jet into the discharge conduit and having lateral openings for delivering water to said passageway.

4. Apparatus for distributing fertilizers, insecticides and the like, comprising an elongated fluid-tight container for the material to be distributed, a discharge conduit connected to one end of the container adjacent the bottom thereof, a water supply conduit connected to the opposite end of the container and axially alined with the discharge conduit, said supply conduit having a portion extending into the container and provided with a restricted outlet adjacent the discharge conduit for directing an entraining jet into said discharge conduit, the portion of said supply conduit within the container having spaced lateral openings, and a partition member extending from one end of the container to the other, said partition member being disposed over the supply conduit and having downwardly extending diverging side portions which extend to closely adjacent the bottom of the container with their edges spaced from said bottom to provide a water passageway and elongated side slots through which material in the container may enter the passageway.

5. Apparatus for distributing fertilizers, insecticides and the like, comprising a substantially cylindrical fluid-tight container for the material to be distributed adapted to be supported with its axis horizontal, a discharge conduit connected to one end of the container adjacent the cylindrical wall thereof, a water supply conduit connected to the opposite end of the container and axially alined with the discharge conduit, said supply conduit having a portion extending into the container and provided with a restricted outlet for directing an entraining jet of water axially into the discharge conduit, said supply conduit having spaced lateral openings within the container, a partition member extending from one end of the container to the other over the supply conduit, said partition member having downwardly extending diverging side portions, the edges of which are spaced slightly from the container wall to provide a water passageway with side slots for entry of material from the container, and a bung in the same end of the container as that to which the discharge conduit is connected.

6. Apparatus for distributing fertilizers, insecticides and the like, comprising an elongated fluid-tight container for the material to be distributed, a discharge conduit connected to one end of the container adjacent the bottom thereof, a water supply conduit connected to the opposite end of the container and axially alined with the discharge conduit, said supply conduit having a portion extending into the container and provided with a restricted outlet adjacent the discharge conduit for directing an entraining jet into said discharge conduit, the portion of said inlet conduit within the container having spaced lateral openings, and a partition member extending from one end of the container to the other, said partition member being disposed over the supply conduit and having downwardly extending diverging side portions which extend to closely adjacent the bottom of the container with their edges spaced from said bottom to provide a water passageway and elongated side slots through which material in the container may enter the passageway, the edges of said partition member having longitudinally spaced upwardly extending slits, the slits along one edge being staggered with respect to the slits along the other edge.

7. Apparatus for distributing fertilizers, insecticides and the like, comprising a fluid tight container for the material to be distributed, a partition member within the container adjacent the bottom thereof, said partition member being of arched form and having its opposite side portions downwardly diverging, the edges of said partition member being closely adjacent but spaced from the bottom of the container whereby said partition member forms an elongated passageway with side slots through which material in the container may enter said passageway, each edge of said partition member having longitudinally spaced upwardly extending slits, the slits of one edge being staggered with respect to slits of the other, a discharge conduit opening to one end of said passageway, a water supply conduit having a portion within said passageway and provided with a restricted outlet for directing an entraining jet into the discharge conduit, said supply conduit having a row of small openings on each side directed laterally and downwardly toward the adjacent lower edge portion of said partition member, the openings on one side being staggered with respect to the openings on the other, said openings being directed toward the portions of the partition member between said slits.

8. Apparatus for distributing fertilizers, insecticides and the like, comprising a fluid tight container for the material to be distributed, a partition member within the container adjacent the bottom thereof, said partition member being of arched form and having its opposite side portions downwardly diverging, the edges of said partition member being closely adjacent but spaced from the bottom of the container whereby said partition member forms an elongated passageway with side slots through which material in the container may enter said passage, a discharge conduit to which one end of said passageway opens, a water supply conduit, means associated with said conduit for directing an entraining jet into said discharge conduit and for supplying water to said passageway whereby water may be caused to flow through said passageway into the discharge conduit, and a removable closure member for a container opening provided with a projecting portion to which a material containing bag may be attached.

ANDREW J. GORLICK.